Aug. 28, 1956 W. R. ROOP 2,760,765
APPARATUS FOR AERATING AND AGITATING MILK
Filed Jan. 16, 1953 3 Sheets-Sheet 1

INVENTOR
WILLIAM ROGER ROOP,

BY *Stone, Boyden & Mack*
ATTORNEYS.

Aug. 28, 1956 W. R. ROOP 2,760,765
APPARATUS FOR AERATING AND AGITATING MILK
Filed Jan. 16, 1953 3 Sheets-Sheet 2
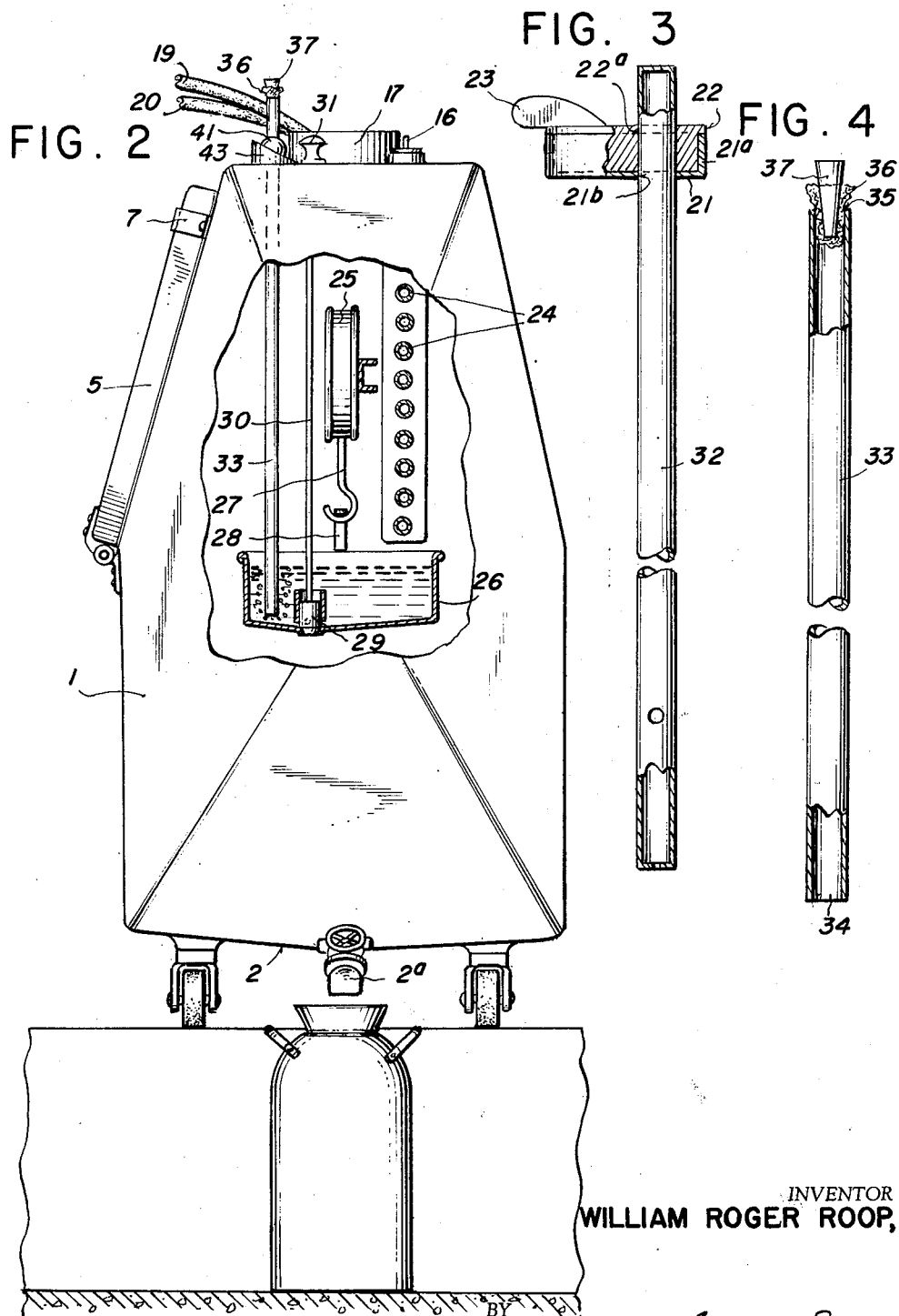
INVENTOR
WILLIAM ROGER ROOP,
BY Stone, Boyden & Mack,
ATTORNEYS Aug. 28, 1956   W. R. ROOP   2,760,765
APPARATUS FOR AERATING AND AGITATING MILK
Filed Jan. 16, 1953   3 Sheets-Sheet 3

INVENTOR.
WILLIAM ROGER ROOP,
BY
Stone, Boyden & Mack
ATTORNEYS.

United States Patent Office 2,760,765
Patented Aug. 28, 1956

2,760,765

APPARATUS FOR AERATING AND AGITATING MILK

William Roger Roop, Keymar, Md.

Application January 16, 1953, Serial No. 331,574

8 Claims. (Cl. 261—121)

This invention relates to a machine for processing milk by aerating and stirring it immediately after the milking operation.

The improvement is particularly adapted for use in connection with cabinets of the type shown in my Patent 2,631,566, issued March 17, 1953, which cabinet operates under sub-atmospheric pressure and is adapted to receive milk directly from the pipe or tubes leading from the milking device.

According to the present invention, air is led to the bottom portion of the cabinet, bucket or other storage vessel such as the said cabinet, which is under vacuum. It is introduced by means of a tube which is extended through the upper portion of the cabinet. Associated with the tube at its upper end, and thus at the exterior of the cabinet, is a filter, whereby air is admitted to the interior of the tube and filtered when so entering. The air is released at the lower end of the tube as a result of the reduced pressure within the cabinet which tends to draw air downwardly through the tube.

The tube is so mounted and supported by the cabinet that the tube may be swung, oscillated, or otherwise moved, during which time its lower end is projecting into the milk. The release of air bubbles from the lower end of the tube agitates the milk as the bubbles are liberated from the tube and move upwardly through the milk. The movement of the tube likewise serves to some extent to stir the milk, although such movement is chiefly to position the point of release of the bubbles. In short, although it is possible, it is not intended that the tube serve as an agitating device per se, as would be the case if it were moved rapidly within the milk.

One of the advantageous features of the invention relates to the mounting of the tube in the upper portion of the cabinet whereby the tube may be projected into the cabinet and swung into different positions while at the same time the mounting is substantially airtight.

The foregoing and additional advantages and details of the machine are described and claimed in the following specification and claims and will be considered in connection with the accompanying drawings, in which:

Fig. 2 is an end view of the cabinet shown in Fig. 1 with a portion broken away to show a modification of the tube device according to which a tube is adapted to project into one of the buckets adapted to receive milk while being weighed;

Fig. 3 is an enlarged side elevation of a milk sampling tube such as used in connection with the cabinet shown in my said Patent 2,631,566 and illustrating the type of airtight mounting used for the sampling tube according to that application;

Fig. 4 is a side elevation of a stirring tube and air filter according to the present invention;

Figure 1:
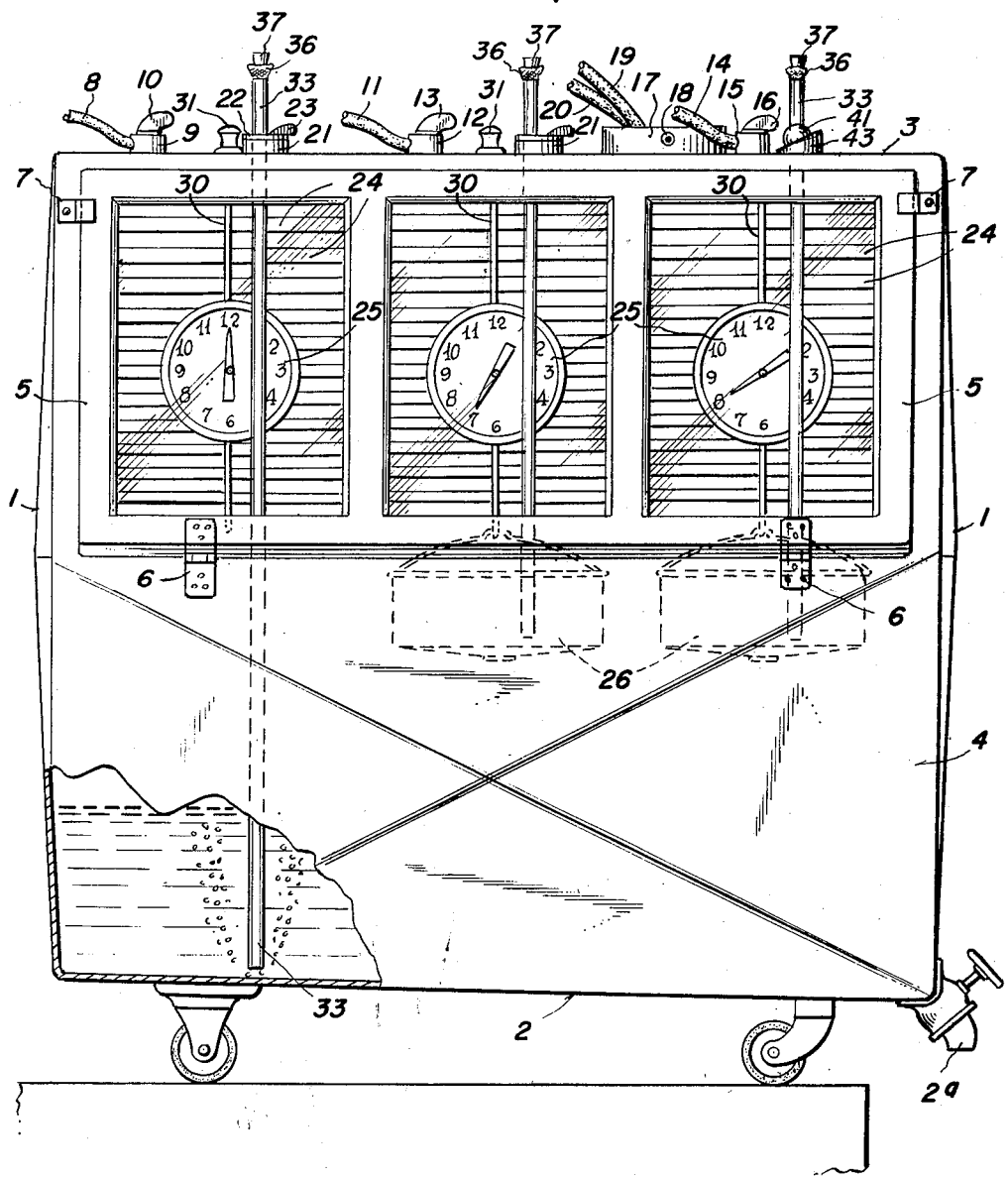
Fig. 1 is a side elevation of a cabinet such as shown in my Patent 2,631,566, showing the addition of the filtering device and tube for releasing air bubbles at a point adjacent the bottom of the cabinet.

In order that the present improvement may be understood with respect to the dairy industry, the following general explanation is set forth regarding the cabinet of my Patent 2,631,566 and the manner in which it is operated. The cabinet is so designed that it will handle the milk from one cow or a plurality of cows simultaneously and individually. The normal functioning of the cabinet provides for the following procedure. As the milk enters the top of the cabinet, it flows into a distributing pan which permits it to flow downwardly over a surface cooler into a bucket or pail which is suspended from a weighing scale. The refrigerating fluid, cold water, for example, is pumped through the cooler, thereby cooling the milk within a few seconds after it has been milked from the cow. The distributing pan, the cooler, and the weighing scale enter into the operating combination of parts, all of which are preferably located within the airtight cabinet. A glazed inspection window and interior illumination make it possible to observe the flow of milk and read the scale without exposure of the milk to milking parlor atmosphere.

Among the advantages inherent to the machinery of said application for handling milk, it will be noted that the milk from a certain cow is weighed and collected in a certain bucket. It will also be obvious that one of these improved cabinets may be designed to contain any number of scales and buckets. A satisfactory operating size provides for three units within each cabinet, thus serving to handle individually the milk from three cows. The milk from several cows is maintained separate until approved. Thus, if the milk of any one cow is found to be discolored or otherwise of a condition rendering it unfit for use, operation of the machine can be stopped temporarily; the cabinet opened and that pail of milk which is unfit can be removed without contaminating the milk from the other two cows.

One feature of the apparatus of that application includes the arrangement by which the milk which has been weighed in a bucket can be released from that bucket to the lower portion of the interior of the cabinet from which it can be drawn off as desired. The control for the release of the milk from the buckets or pails is designed to be manipulated from the exterior of the cabinet.

As a matter of convenience, the cabinet being portable and preferably mounted on wheels, it may be rolled to a suitable delivery point where the milk from the cabinet may be drawn out by gravity into shipping cans.

Referring in detail to the several views in the drawings, like parts in the several figures are identified by like reference characters.

Referring to Figs. 1 and 2, it will be noted that the cabinet has vertical end walls 1, a bottom or floor 2, and a top or roof portion 3. The side walls are indicated at 4 and extend from the floor 2 upward to the top 3. For about one-half the height of the cabinet, the side walls 4 are more or less vertical and from that intermediate point upwardly the side walls are sloped inwardly. At least one of the side walls 4 is provided with a door 5 in the upper and sloping portion of the side wall and which door is mounted on the side wall by means of hinges 6, along the lower edge of the door. The door may be thus swung outward and downwardly for convenient access to the interior of the cabinet. The door must have an air tight fit against the side wall so as to maintain the sub-atmospheric pressure within the cabinet. Suitable pivoted latches indicated at 7 may be provided whereby the door 5 may be tightly clamped against the wall 4. As shown in Fig. 1, the door is provided with a window opening covered by an inspection glass through which the interior of the cabinet may be viewed.

Referring to Fig. 1, the tubes or pipes leading from the milking device, not shown, are indicated at 8, 11 and 14. The connections from the respective milking machines as shown in Fig. 1 follow the same arrangement as shown in the drawings of my said Patent 2,631,566. On the upper wall or top 3 of the cabinet is mounted a device identified as a pulsator 17, the function of which is to provide the intermittent or pulsating action essential to permit proper milking. This pulsator 17 is connected to a vacuum pump by a suitable pipe or hose which is connected to the pulsator 17 at a port 18. Milk from the milking element of three cows passes through the respective pipes 8, 11 and 14 and is admitted into the cabinet intake ports having corresponding intake valves 9, 12 and 15, each having corresponding respective control handles 10, 13 and 16. The pipes 19 and 20 and a third pipe (not shown) leading from the respective milking devices, lead directly to the pulsator 17 and it is through these three pipes that the pulsating influence is transmitted to the milking devices.

Means for weighing the milk from the respective cows and their milking parlor sections is accomplished by means of weighing scales 25, mounted on a fixed frame element which is shown in Fig. 2 as a channel member extending lengthwise of the cabinet. This supporting channel element has its ends secured to the end walls 1 by means not illustrated. Extending downwardly from the scale is a suitable work supporting hooked member 27 which is adapted to support a bucket 26. The bucket has a bale 28 which is normally in engagement with the hooked end of the work supporting member 27. In the position shown in Figs. 1 and 2, the bucket is thus in position to receive incoming milk to weigh it and have other inspection made before the milk is released from the bucket. According to my said patent, the bucket 26 has a bottom wall in which is located an outlet opening or discharge port having a marginal wall or valve seat which is adapted to be closed by the lower end of a valve 29. The valve 29 is manipulated from a point above the cabinet by means of a rod 30, which projects upwardly through the roof of the cabinet and terminates in an exteriorly located handle 31.

Means for cooling the milk as it is received through the several intake pipes 8, 11 and 14 is shown diagrammatically at 24 which indicate a series of cooling tubes arranged horizontally and lengthwise of the cabinet. As the milk passes downwardly over the cooling tubes, through which a cooling medium is circulated, the milk is led from the respective intake tubes to each of the several buckets 26 from which samples may be taken by means of a sampling tube as disclosed in said patent and which is also illustrated in Fig. 3 herein.

Milk released from the respective buckets or pails 26 into the bottom of the cabinet may be withdrawn from the cabinet through a discharge pipe 2ª located at a lowermost point and which is provided with a suitable valve. The bottom of the cabinet is provided with wheels whereby the cabinet may be rolled to a convenient unloading point.

Means for sampling the milk after it has been received in the bucket 26 has been made possible by the use of a series of air tight valves located on the top 3 of the cabinet. These valves are shown at 21 in Figs. 1 and 3. According to one form of the valve structure, they include a cup 21 which may be embedded in or rest securely on the surface of the top 3 of the cabinet. Each cup has a bottom wall and a cylindrically shaped side wall as indicated at 21ª in Fig. 3. Through the bottom wall of the cup 21 is an opening 21ᵇ through which access may be had to the interior of the cabinet. It will be understood that the top wall of the cabinet 3 must have an opening in alignment with the opening 21ᵇ. Seated in the cup 21 and extending downwardly into the spacing within the side wall thereof is a snugly fitting valve block 22. The valve block 22 is provided with an opening vertically therethrough as at 22ª and which opening is adapted to be brought into registry with the opening 21ᵇ when a sample of the milk is to be taken from a pail. A handle 23 projects upwardly and outwardly from the upper surface of the valve block 22 whereby the valve block may be rotated within the cup wall 21ª when it is desired to bring the openings 22ª and 21ᵇ into registry with each other.

A conventional sampling device is shown in Fig. 3 as consisting of a long tube 32 which is adapted to be inserted through the openings 22ª and 21ᵇ when they are in registry and which tube is to be lowered until its lower end is well down within a bucket. Thereupon a sample of milk may be taken and raised upwardly and withdrawn for inspection purposes. When the tube is removed the valve block 22 is turned so that the openings are no longer in registry and the sub-atmospheric pressure within the cabinet can thus be maintained. The foregoing describes the essential features of the cabinet with which the air filtering and milk agitating device of this improvement is particularly adapted for use, as will now be described.

The present improvement provides for the use of a device for admitting filtered air into the cabinet for release at any point within the cabinet as may be desired. For example, the point of release may be within one of the buckets or it may be adjacent the floor of the cabinet. A cylindrical tube for this purpose is shown at 33 in Fig. 4. Its lower end 34 and upper end 35 may be the usual ends of a cylindrical tube. However, at its upper end 35, a filtering device is mounted as shown in Fig. 4. This device includes a cotton milk filter disc 36 which is wrapped around a tapered plug 37. The wrapped plug is thrust into the upper end of the tube 35. The tapered portion of the plug 37 is such as to adapt the plug to remain within the tube and to be adjustable lengthwise of the tube so as to control at the will of the operator the amount of air which is permitted to pass through the filter 36 downwardly through the tube under the influence of the maintained sub-atmospheric pressure within the cabinet. The exterior contour and dimensions of the tube 33 are preferably of the same size and shape as those of the tube 32, so that it may be thus possible to insert the tube 33 through the same valve blocks 22 through which the sampling tubes can be inserted. The use of the valve blocks 22 such as shown in Fig. 3 are subject to certain limitations, however, in that the position of the tube 33 is adjustable only vertically. A modification of the mounting for the tube 33 is desirable so that the release of air bubbles from the lower end of the tube 33 may be varied from one lateral position to another. The structure permitting such adjustment will now be described.

Figure 5:
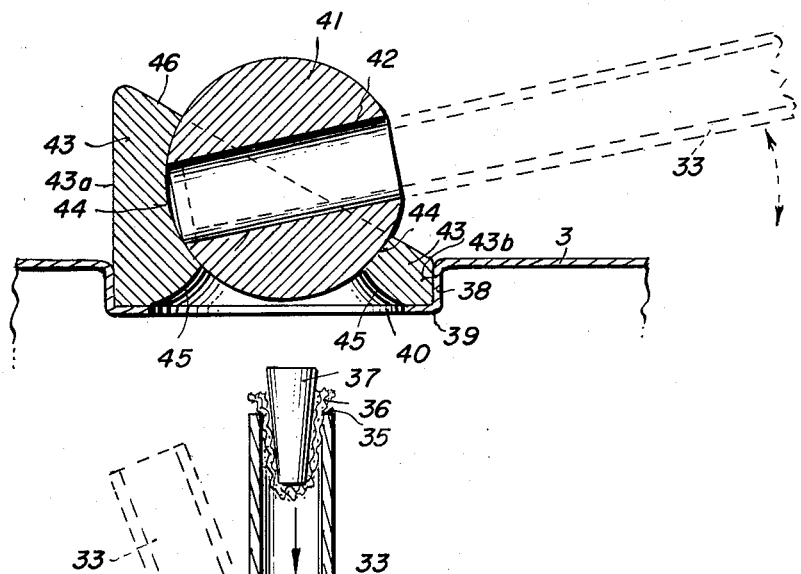
Fig. 5 shows a modified form of air seal mounting for the tubes such as shown in Figs. 3 and 4.
Figure 6:
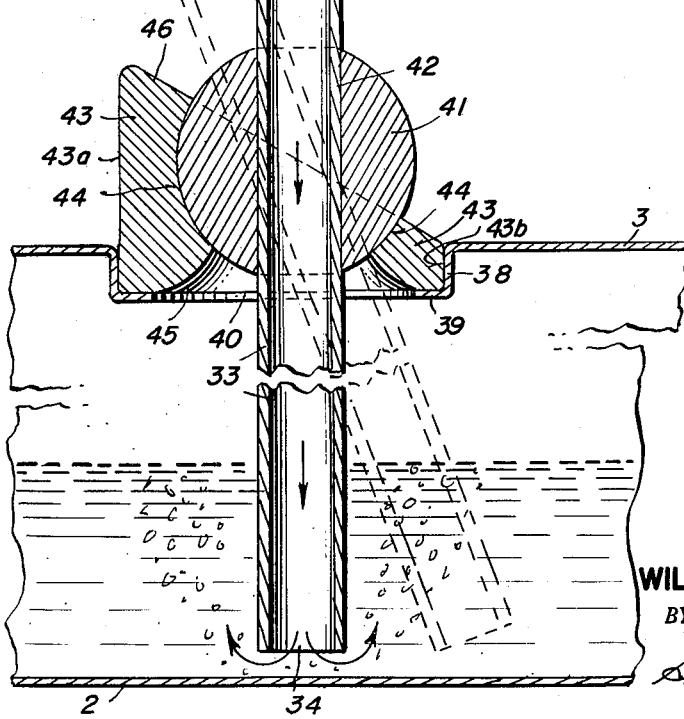
Fig. 6 is a view of the same device as shown in Fig. 5 and illustrating in solid lines the tube extending vertically into a cabinet containing milk and in dotted lines showing the tube in a different position.

A modified and improved form of mounting for the tube 33 and its filtering element 35 is now described. Referring to Figs. 5 and 6, it will be noted that the roof or upper surface of the cabinet which is indicated at 3, as in Figs. 1, 2 and 3 is provided with a depressed portion having side walls 38 which extend downwardly into the cabinet and a laterally extending portion 39. The portion 39 is substantially a ledge extending laterally from the lower edge of the wall 38. Centrally located within the ledge 39 is an opening 40, the function of which will be described. The improved mounting for the tube 33 rests in the above mentioned depressed portion within the wall 38 and upon the upper surface of the ledge 39. The mounting consists of a ball and socket combination in which the ball is indicated at 41. The ball is peculiar in that it is provided with a bore or opening diametrically therethrough as indicated at 42. This bore 42 is adapted to receive the tube 33 which has a substantially air tight but slidable fit within the wall of the bore. The ball is mounted in a bearing block or socket member 43 which has a concave surface 44 corresponding to about one-half of the exterior surface of the ball 41. By limiting the socket member 43 and its concave socket surface 44 to half the diameter of the ball, it is thus possible for the ball to rest in the concavity 44 and be seated by its own weight so as to provide a substantially air tight fit between the exterior surface of the ball and the surface of the concavity 44. Similarly when desired, the ball may be lifted outwardly for cleaning.

By reference to Figs. 5 and 6, it will be noted that the socket member 43 is provided with an opening on its underneath surface as indicated at 45, and which opening is aligned with the opening 40 of the supporting ledge 39 in the roof of the cabinet. It will be observed that the openings 40 and 45 are considerably larger than the diameter of the tube 33. This relation of sizes contributes to the possibility of tilting or rocking the ball 41 and the tube 33 with respect to a vertical position, thus as shown in dotted lines in Fig. 6. By reason of this tilting of the tube 33, it is possible to release bubbles over quite a wide area within the cabinet or within a bucket.

It will be observed that the socket member 43, as shown in Figs. 5 and 6, is higher at one side than at the other. Thus, one side indicated at 43ᵃ is quite high, whereas the opposite side 43ᵇ is substantially the height of the wall 38 of the depressed portion of the roof 3. This difference in the height of the opposite sides of the socket member provides an inclined face 46 between the two walls 43ᵃ and 43ᵇ. Correspondingly the surface of the socket face 44 is higher on that side of the socket member next adjacent the side wall 43ᵃ. By reason of this enlarged surface of the socket wall 44, it is possible to provide a closure for the mounting when the ball is rocked to a position as shown in Fig. 5 whereby one end of the bore 42 of the ball faces an intermediate portion along the height of the socket wall 44 and is closed from access to the interior of the cabinet 3 by reason of the fact that the adjacent exterior surface of the ball meet with an air tight contact with the surrounding portions of the socket surface 44. In this position, as shown in Fig. 5, the opening 45 in the socket member is closed by the exterior side of the ball 41, and thus the opening 45 is closed and the cabinet may be maintained under subatmospheric pressure. When manipulating the ball 41 to bring it to the positions shown in either Figs. 5 or 6, such action is readily performed by using the tube 33 as a lever, and as shown in Fig. 5, only the end portion of the tube 33 would be used within the ball for the purpose of tilting it.

It will be understood from the foregoing that sampling tubes such as 32, Fig. 3, may be inserted through the ball and socket mounting such as shown in Figs. 5 and 6 in lieu of the filtering device shown in Figs. 5 and 6. For convenience in illustrating the optional use, there are shown in Fig. 1 filtering elements in two of the valve block structures such as shown in Fig. 3, whereas the third member at the right upper surface of the cabinet, shown in Fig. 1 and indicated at 43, is of the ball and socket type, as shown in Figs. 5 and 6. This latter ball and socket element is shown in Fig. 2 which is an end view of the apparatus illustrated in Fig. 1 looking at Fig. 1 from the right.

I claim:

1. In a machine for processing milk, a cabinet, the interior of which is maintained under sub-atmospheric pressure, means for introducing milk into said cabinet, and means for introducing air into said cabinet and releasing it below the upper surface of milk therein to effect a mixing of the milk, said latter means comprising a straight tube extending downwardly through the upper portion of said cabinet with which its exterior has a substantially airtight fit and having its lower end extending well down within said cabinet so as to project into milk within the same, said tube having an opening at its lower end for the release of air drawn through said tube due to the sub-atmospheric pressure with said cabinet, and the upper end of said tube being provided with adjustable closure means whereby the entry of air into said tube is regulated, said closure means including a plug fitted into the upper end of said tube and having its upper end above the upper end of said tube and a filter element encircling said plug and being located between it and the adjacent wall of said tube, whereby air is permitted to pass in restricted amount between said plug and said tube and is filtered while thus entering said tube.

2. In a machine for processing milk, a cabinet, the interior of which is maintained under sub-atmospheric pressure, means for introducing milk into said cabinet, and means for introducing air into said cabinet and releasing it below the upper surface of milk therein to effect a mixing of the milk, said latter means comprising a straight tube extending downwardly through the upper portion of said cabinet with which its exterior has a substantially airtight fit and having its lower end extending well down within said cabinet so as to project into milk within the same, said tube having an opening at its lower end for the release of air drawn through said tube due to the sub-atmospheric pressure within said cabinet, and the upper end of said tube being provided with adjustable closure means whereby the entry of air into said tube is regulated, said closure means including a tapered plug fitted into the upper end of said tube and having its large end above the upper end of said tube and a filter element encircling said plug and being located between it and the adjacent wall of said tube, whereby air is permitted to pass in restricted amount between said plug and said tube and is filtered while thus entering said tube.

3. In a machine for processing milk, a cabinet, the interior of which is maintained under sub-atmospheric pressure, means for introducing milk into said cabinet, and means for introducing air into said cabinet and releasing it below the upper surface of milk therein, said means including a ball and socket member mounted on said cabinet, said cabinet having an opening and said socket member having an opening and a base portion mounted on said cabinet adjacent said opening therein so that the two openings register, and said ball having an opening therethrough which is adapted to register with said openings in said cabinet and said socket member, and a straight tube slidably mounted in said opening in said ball and having a substantially airtight fit between the tube exterior and the wall of the opening in said ball, said tube having a length sufficient to extend from the outer side of said ball to a point adjacent the bottom of the interior of said cabinet.

4. In a machine for processing milk, a cabinet, the interior of which is maintained under sub-atmospheric pressure, means for introducing milk into said cabinet, and means for introducing air into said cabinet and releasing it below the upper surface of milk therein, said means including a ball and socket member mounted on said cabinet, said cabinet having an opening and said socket member having an opening and a base portion mounted on said cabinet adjacent said opening therein so that the two openings register, and said ball having an opening therethrough which is adapted to register with said openings in said cabinet and said socket member, and a straight tube slidably mounted in said opening in said ball and having a substantially airtight fit between the tube exterior and the wall of the opening in said ball, said tube having a length sufficient to extend from the outer side of said ball to a point adjacent the bottom of the interior of said cabinet, said socket member having a socket adapted to engage only about one-half of the outer area of said ball, whereby the ball may be freely withdrawn from said socket.

5. In a machine for processing milk, a cabinet, the interior of which is maintained under sub-atmospheric pressure, means for introducing milk into said cabinet, and means for introducing air into said cabinet and releasing it below the upper surface of milk therein, said means including a ball and socket member mounted on said cabinet, said cabinet having an opening and said socket member having an opening and a base portion mounted on said cabinet adjacent said opening therein so that the two openings register, and said ball having an opening therethrough which is adapted to register with said openings in said cabinet and said socket member, and a straight tube slidably mounted in said opening in said ball and having a substantially airtight fit between the tube exterior and the wall of the opening in said ball, said tube having a length sufficient to extend from the outer side of said ball to a point adjacent the bottom of the interior of said cabinet, said socket member having a socket adapted to engage only about one-half of the outer area of said ball, whereby the ball may be freely withdrawn from said socket, said ball being adapted to be held in said socket by gravity and suction due to the sub-atmospheric pressure within said cabinet.

6. In a machine for processing milk, a cabinet, the interior of which is maintained under sub-atmospheric pressure, means for introducing milk into said cabinet, and means for introducing air into said cabinet and releasing it below the upper surface of milk therein, said means including a ball and socket member mounted on said cabinet, said cabinet having an opening and said socket member having an opening and a base portion mounted on said cabinet adjacent said opening therein so that the two openings register, and said ball having an opening therethrough which is adapted to register with said openings in said cabinet and said socket member, and a straight tube slidably mounted in said opening in said ball and having a substantially airtight fit between the tube exterior and the wall of the opening in said ball, said tube having a length sufficient to extend from the outer side of said ball to a point adjacent the bottom of the interior of said cabinet, said ball having an airtight seat against the wall of said socket member.

7. In a machine for processing milk, a cabinet, the interior of which is maintained under sub-atmospheric pressure, means for introducing milk into said cabinet, and means for introducing air into said cabinet and releasing it below the upper surface of milk therein, said means including a ball and socket member mounted on said cabinet, said cabinet having an opening and said socket member having an opening and a base portion mounted on said cabinet adjacent said opening therein so that the two openings register, and said ball having an opening therethrough which is adapted to register with said openings in said cabinet and said socket member, and a straight tube slidably mounted in said opening in said ball and having a substantially airtight fit between the tube exterior and the wall of the opening in said ball, said tube having a length sufficient to extend from the outer side of said ball to a point adjacent the bottom of the interior of said cabinet, said openings in said socket member and said cabinet being sufficiently larger than the outer dimension of said tube to permit lateral movement of the lower end of said tube within said cabinet, said socket being adapted to engage only about one-half of the outer area of said ball, whereby said ball may be freely withdrawn from said socket, said ball being adapted to be held in said socket by gravity and suction due to the sub-atmospheric pressure within said cabinet.

8. In a machine for processing milk, a cabinet, the interior of which is maintained under sub-atmospheric pressure, means for introducing milk into said cabinet, and means for introducing air into said cabinet and releasing it below the upper surface of milk therein, said means including a ball and socket member mounted on said cabinet, said cabinet having an opening and said socket member having an opening and a base portion mounted on said cabinet adjacent said opening therein so that the two openings register, and said ball having an opening therethrough which is adapted to register with said openings in said cabinet and said socket member, and a straight tube slidably mounted in said opening in said ball and having a substantially airtight fit between the tube exterior and the wall of the opening in said ball, said tube having a length sufficient to extend from the outer side of said ball to a point adjacent the bottom of the interior of said cabinet, said socket member being higher on one side of the opening therein than at the opposite side thereof, whereby said ball may be rocked until one end of its opening therethrough faces the curved wall of said socket at the higher side thereof and the curved face of said ball extends across and closes said opening in said socket member which leads to said cabinet.

References Cited in the file of this patent

UNITED STATES PATENTS

| | | |
|---|---|---|
| 564,325 | Cole | July 21, 1896 |
| 999,599 | Schneider | Aug. 1, 1911 |
| 1,570,180 | Pulliam | Jan. 19, 1926 |
| 1,622,832 | Lambert | Mar. 29, 1927 |
| 2,255,661 | Greenslade | Sept. 9, 1941 |
| 2,626,138 | Stevens | Jan. 20, 1953 |
| 2,631,566 | Roop | Mar. 17, 1953 |

FOREIGN PATENTS

| | | |
|---|---|---|
| 988,687 | France | May 9, 1951 |